April 18, 1939.    K. EBNER    2,155,119
PROCESS OF AND APPARATUS FOR THE THERMAL DECOMPOSITION
OF SUBSTANCES OR MIXTURES OF SAME
Filed Aug. 10, 1936
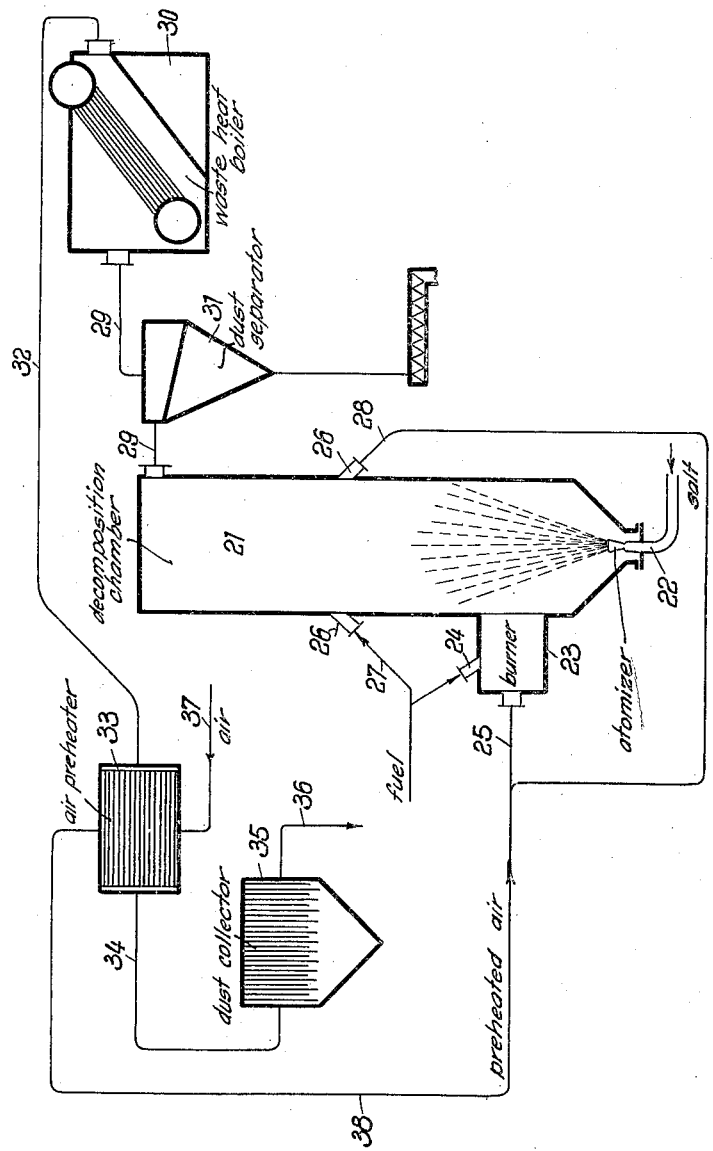
Inventor:
Karl Ebner
by Potter, Pierce & Scheffler
his Attorneys Patented Apr. 18, 1939

2,155,119

UNITED STATES PATENT OFFICE 2,155,119

PROCESS OF AND APPARATUS FOR THE THERMAL DECOMPOSITION OF SUBSTANCES OR MIXTURES OF SAME

Karl Ebner, Oberursel, near Frankfort-on-the-Main, Germany, assignor to American Lurgi Corporation, New York, N. Y., a corporation of New York Application August 10, 1936, Serial No. 95,304
In Germany August 13, 1935

8 Claims. (Cl. 23—1)

This invention relates to a process of and apparatus for the thermal decomposition of substances or mixtures of same, and more particularly to the thermal decomposition of substances which are no longer stable at high temperatures but are decomposed into simpler chemical compounds, or simpler chemical compounds and elements. Such substances comprise, for example, most of the salts of heavy metals and many salts of the earth metals, alkaline-earth metals, and alkali metals. Silver sulphate, for example decomposes, at about 1100° C. into silver, sulphur dioxide, sulphur trioxide and oxygen. The sulphates of iron, manganese, copper, nickel, cobalt, zinc, magnesium and so forth, also decompose at known temperatures—between 800° and 1300° C.—with or without liberation of oxygen and the formation of oxides of sulphur and metallic oxides. In a similar manner, the chlorides, nitrates, carbonates, hydrates, and like compounds, of the heavy metals can be decomposed by heat. The nitrates, carbonates or hydrates of the earth metals, alkaline-earth metals and alkali metals, and also various chlorides of these metals (such as magnesium chloride) also decompose on heating, with formation of their oxides. Moreover, mixtures of the said substances, and also many organic compounds can also be decomposed, by heat, according to the process of the present invention.

According to the present invention, concentrated solutions, suspensions or aqueous melts of the foregoing substances or mixtures, are transformed into a finely divided state, and in that condition, are brought into intimate contact with a highly heated gaseous medium flowing in the same direction, in an elongated chamber, the said medium transmitting heat to the atomised materials. The effect of such high temperature and the use of such quantities is the successive dehydration and desired thermal conversion of the materials. The dehydration proceeds instantaneously and causes a further, and very extensive disruption of the droplets. The solid products of the thermal decomposition are then separated from the gaseous medium, usually in a pulverulent, solid form. The gaseous decomposition products, and the water evaporated from the solution, suspension or melt, pass into the gaseous medium, from which they can be separated and recovered, if desired.

The hereindescribed process may be carried out, for example, by finely atomising the substances and bringing them into intimate contact with highly superheated steam or hot gases at temperatures exceeding the decomposition temperature of the materials. By atomising the materials, in the form of a concentrated solution, an aqueous melt, or a suspension (for example in water or aqueous solutions) of solid substances, the atomisation can be performed in an extremely uniform manner, and, in particular, the progress of the resulting fog or haze, through the heating chamber is completely under control. This, in turn, results in the thermal decomposition proceeding in a highly uniform and complete manner, and in minimum time. The process therefore operates with a high throughput capacity. The conversion into mist, or atomised condition, and the succeeding rapid evaporation of the water, effect a specially favourable distribution of the materials in the decomposition chamber. On the other hand, the surface of the reacting material is increased to an optimum, and, accordingly, the hot gases are able to act very intensively on the materials. This results in the further advantage that, in case of need, the gases required for the decomposition have merely to be heated to a small extent above the theoretical decomposition temperature. Of course, however, higher heating temperatures may also be employed.

In the event of there being any risk of the decomposition products reacting undesirably, during cooling, with substances contained in the effluent gases, this can be obviated by separating the solid constituents for example, from the gases at such a high temperature or by cooling the gases so rapidly to below the reaction temperature, that dangerous changes can no longer occur. After the removal of the solid substances, the gases and their several constituents are utilised in the hereindescribed manner.

If the thermal decomposition in accordance with the invention be carried out by passing the finely atomised solution, suspension or aqueous melt, in the same direction as the heating medium, through an elongated chamber, such as a tower or an obliquely or horizontally mounted channel, the highly heated heating medium will in the first place evaporate, the water introduced with the substances into the decomposition chamber, and the heating medium will become inoperative when its temperature has fallen below the decomposition temperature of the materials. On the other hand, however, there is the advantage that the heating medium can be passed, at a high velocity, through the decomposition apparatus, thereby increasing its throughput capacity to an unusual extent.

For example, in carrying out the invention, a concentrated saline solution, or aqueous melt, is admitted into the bottom of a tower, through a nozzle, by means of steam, compressed air, or the like, in such a way that the introduced liquid is dispersed in the form of a fine mist or haze which rises in the tower. The atomising device may be located, preferably centrally, in the bottom of the tower. Alternatively, it may be arranged in or near the side walls of the lower portion of the tower, or a plurality of atomising devices may be provided in the bottom and/or side walls. The heating medium enters the tower, at one or more points near the inlet of the saline solution, and quickly mixes with the mists or haze formed by the liquid. When high decomposition temperatures are of advantage or necessary, the heating medium is employed for example, at a temperature between 1500° and 1800° C.

If it be desired to keep the temperatures of the heating medium down to a lower level, additional heating medium may be introduced in the higher parts of the tower, so as to supply heat, by stages, to the elongated decomposition chamber.

In order to utilise the elongated decomposition chamber as completely as possible, the supply of heat and of the substances to be decomposed is so adjusted that the gases issue from the tower at temperatures in the vicinity of the decomposition temperature of the substances under treatment.

In this confluent method of operating, the effluent gases from the tower carry with them practically the whole of the solid decomposition products. It is preferable in the first place to deposit the bulk of the solids by separating them from the gases, for example in a cyclone apparatus, whereupon, for the purpose of utilising their heat, the gases are passed, for example through a waste-heat boiler, recuperator or the like. Such heat exchangers may, however, also be interposed between the decomposition chamber and the cyclone. In order to cool the gases further, they are passed, for example through an air preheater or similar heat exchangers, to be then freed from the remainder of the solid substances in purifying apparatus, such as electric gas cleaners, if desired.

It has transpired that a very considerable proportion of the heat of the gases can be recovered in the said, or other, heat exchangers.

The gaseous heating medium may consist, apart from superheated steam, of gases of combustion which have been brought to a suitable temperature, by suitable methods of production, or by mixing with air or other gases, or by mixing with gas in circulation. Gases of combustion may also be replaced, as heating medium, by other hot gases, such as suitably heated air, nitrogen or carbon dioxide.

The heating medium is preferably employed at atmospheric pressure. In some cases, however, it may be advisable to operate at higher pressure or under a low vacuum. If superheated steam be used as heating medium, any surplus steam occurring in the course of the process and incapable of being used therein, can be utilised, for other purposes, such as pre-heating or concentration processes, or as injector steam.

The employment of such gases as nitrogen or carbon dioxide, the production of which is attended with a certain expense, can be rendered economical by employing the heating gases over again, in circulation.

The materials are preferably atomised by means of compressed air or steam, which is supplied to the atomiser device (such as a nozzle) through a pipe, or, wholly or in part, by allowing a solution, suspension or aqueous melt of the substances to expand from a higher pressure, under which, for example, the dilute solution has previously been concentrated, to the pressure prevailing in the decomposition apparatus.

The heat-economy of the hereindescribed process can always be placed on a highly advantageous basis by utilising the heat of the hot exhaust gases in the process itself or for other purposes. For example, the heating gases are used again, in circulation by arranging for them to give up their surplus heat in heat exchangers, preferably after the solid decomposition products have been more or less completely separated therefrom. The separation of the gaseous decomposition product, (and of the steam, if desired) is effected, and the gases treated in this manner are pre-heated, by exchange of heat with the hot exhaust gases, and afterwards raised to the requisite working temperature in a separate heater, for example a regenerator or recuperator. The heating may also be accomplished by the addition of highly heated gases. In place of a gas circulation, a heat circulation may be established by the continuous generation of fresh heating medium, for example by burning gaseous or liquid fuels in air, the air of combustion, or the combustible gas, or both, being preheated, for example by means of the heat of the exhaust gases. On the other hand, a portion of the gases produced in the hereindescribed process may, after being suitably heated, be immediately used over again as heating medium, without any previous dust-removal treatment and separation of the gaseous decomposition products, whilst any surplus portion of the gases is utilised in the hereindescribed manner, that is, treated for the separation and recovery of solid decomposition products, and also of gaseous decomposition products, if desired, and utilisation of heat. This method of carrying out the hereindescribed process, may be modified by also removing the solid (and, if desired, the gaseous) decomposition products and the steam, from the gas in circulation. When, in accordance with the invention, superheated steam is used as the heating medium, the recovery of heat is effected in a similar manner.
For example, in the thermal decomposition of dissolved salts, or the like, capable of forming crystals containing water of crystallisation, steam is passed in circulation through the heating chamber and a superheater, whilst the surplus steam is withdrawn from circulation and applied to other heating purposes, such as the production or concentration of the solutions under treatment.

The nature of the invention will hereinafter be more fully explained with reference to the following examples:—

A solution of magnesium sulphate, or the like, is atomised by means of nozzles, located in the bottom of a tower, whilst hot gases, such as furnace gases, the temperature of which is correspondingly higher than the theoretical decomposition temperature of the magnesium sulphate, enter the bottom of the tower and ascend concurrently with the charge material, in such a way as to effect the dehydration of the magnesium sulphate, the heating of the same to the decomposition temperature, and its decomposition into magnesium oxide and sulphur trioxide (or dioxide).

The gases formed during the treatment mix with the gaseous heating medium and are led away at the top of the tower. Since the decomposition of the magnesium sulphate proceeds very rapidly, the bulk of the gaseous decomposition products are present as sulphur trioxide in the effluent gases. This trioxide can thus be recovered, in the form of concentrated sulphuric acid, from the exhaust gases, by simple condensation at suitable temperature. If larger amounts of sulphur dioxide be present in the exhaust gases, that oxide can also be recovered, by known methods (for example in contact plants, or tower systems) after the temperature has been suitably adjusted, such recovery being either separate or, in association with the sulphur trioxide, as sulphuric acid.

The exhaust gases also contain the solid decomposition products, such as magnesium oxide, which are separated by known methods, prior to the gases being worked up into sulphuric acid.

Thermal decomposition of other salts can be effected in a manner similar to that described with reference to magnesium sulphate, in cases where such salts break up into their oxides at practically attainable temperatures. For example, the sulphates, chlorides, nitrates, carbonates, hydrates, or the like, of manganese, iron, copper, zinc and similar metals, can be worked up in the same manner. Frequently, in these or other instances, the metallic oxides can be recovered in the form of valuable pigments, the tone of which can be graduated by suitably adjusting the conditions under which the decomposition is effected, for example, the composition and temperature of the heating medium, or by the addition of small quantities of other suitable substances, which can be varied according to requirements.

If, for example, the substances treated are liable to undergo alteration, by oxidation or the like, at the requisite working temperature, and if such alterations are to be prevented, inert gases (such as nitrogen) which are free from oxygen, are used as heat carriers. If, on the other hand, as is the case with certain organic salts, or the like, it is necesary, in view of undesired decomposition phenomena, that a certain working temperature should not be exceeded, the gaseous heating medium is introduced at a lower initial temperature and in a correspondingly larger amount, sufficient to effect the chemical decomposition with a single treatment.

As a further example of the carrying out of the invention, the decomposition of magnesium chloride will be exhaustively described.

The concentrated solutions of magnesium chloride, preferably in a hot condition, or aqueous magnesium chloride melts, such as fused magnesium chloride hexahydrate, which may also contain for example in suspension certain amounts of finely distributed magnesium oxide, or oxychloride, are transformed into mist, or atomised, in a gaseous medium. Said medium is employed at such a high temperature, i. e. about 1300° to 1700° C., that it suddenly dehydrates the mist or fine droplets, and effects the decomposition of the magnesium chloride (and magnesium oxychloride, if any) into magnesium oxide and hydrogen chloride. The latter, and also the steam, can be separated from the gaseous medium by known methods.

After re-heating (and, if desired, after the separation of the hydrogen chloride and steam) the gaseous medium can be used over again as heating medium, in the process. The magnesium oxide is carried off by the gaseous medium, from which it can be recovered by known means, such as a cyclone or an electrical gas purifier.

The accompanying drawing illustrates diagrammatically and by way of example one embodiment of apparatus which is suitable for carrying the invention into practical effect.

In said drawing, 21 denotes an apparatus of the tower type, the iron shell of which is preferably lined with corrosion- and heat-resistant ceramic material, or is made of high-grade steel, chromium-nickel, or chromium-nickel-cobalt alloy, or the like. 22 is an atomiser and 23 represents one or more combustion furnaces or burners, to which the fuel (such as a combustible gas or fuel oil) is admitted through the pipe 24, whilst the preferably preheated air for combustion is supplied through the pipe 25. 26 denotes further arrangements for generating heating gases, which are supplied, through pipes 27, with gaseous, liquid or solid fuels, the combustion air being admitted by way of the pipe 28. Each burner, or the like, 26 is preferably fitted with a branch for fuel and one for the air supply. The fuel and air may, however be separately introduced into the tower 21, the mixing of the air and fuel and the combustion of the latter taking place inside the tower itself. The decomposition tower is in communication with a waste-heat boiler 30, through a conduit 29 in which is interposed a cyclone separator 31. From the boiler 30, the gases flow through the connection 32 into the air pre-heater 33, and thence through the pipe 34 into the final purifying plant 35, designed as an electrical gas cleaner. From this latter, the pipe 36 leads either to the chimney stack, or to known utilisation plants. The combustion air enters the pre-heater 33 by way of the pipe 37, and is conducted through the pipe 38, to the burners, or the like, 23 or 26.

If magnesium sulphate solution is to be worked up into magnesium oxide, it is atomised in the state, for example, of a highly concentrated solution, in the tower 21 by steam blown through the nozzle 22. It then mixes with heating gases supplied from the combustion apparatus 23. The arrangement may also be such that several combustion apparatus 23 are located below the tower and furnish the latter with the heating gases.

The mixture of heating gases and magnesium sulphate rises in the tower with a velocity, for example, of 1 to 3 metres per second. In order to prevent the temperature of the mixture from falling too low, as the result of the heat abstracted in evaporating the water and decomposing the magnesium sulphate, on the way through the tower, and to render the decomposition as complete as possible, it is advisable to introduce an auxiliary supply of heating gases in the upper parts of the tower. The apparatus 26, serving for the generation and introduction of these heating gases may be arranged in the same manner as the combustion furnaces or burners 23 and on the same level with each other. Additional heating gases may also be generated in or introduced into the tower at several suitable levels. Alternatively, air of combustion alone may be admitted at those points, especially when the burners 23 operate with reducing flames. The gases issue from the tower with a temperature of about 1100° C. and are cooled in the waste-heat boiler 30 to a temperature of about 900° C. The steam generated in the waste-heat boiler can be employed, with advantage, for the production or concentration of the magnesium sulphate solution.

After a large portion of the entrained solid constituents has been separated in the cyclone, or the like, 31, and the gases have been cooled in the waste-heat boiler 30, the gases are further cooled down to about 250° C. in the air pre-heater 33. The gases issue from the electrical gas cleaner 35 with a temperature of about 230° C. The combustion air can be pre-heated in the pre-heater 33 up to temperatures of about 400 to 700° C. If the combustion air reaches the burners, or the like, 23 or 26, with these temperatures, even very high temperatures (about 1700° C.) can be attained by the heating medium without difficulty. When decomposing salts, having decomposition temperatures lower than that of magnesium sulphate, the working temperatures in the decomposition chamber may also be lower. For example, in the case of iron sulphate the admission temperature of the heating gases may be 1000 to 1300° C. and the exit temperature 700 to 900° C.

The process of the present invention may also be carried out by passing the solution, melt, or the like, together with the heating medium, through the tower, from above downwards, or through a horizontally or obliquely disposed decomposition chamber.

I claim:—

1. A process of thermally decomposing a metal salt to the production of metal oxide which comprises bringing a finely atomized mixture of the salt and a vaporizable liquid into intimate contact with a heating gas whereby the particles of said mixture are disintegrated by the sudden vaporization of their liquid content, passing the resulting mixture co-currently through an elongated decomposition chamber, the heating gas being in quantity and at a temperature sufficient to vaporize the liquid from the mixture and substantially completely decompose the salt and leave the decomposition chamber at a temperature near the decomposition temperature and carry practically all of the formed metal oxide with it in suspension.

2. A process of thermally decomposing a metal salt to the production of metal oxide which comprises introducing at one end of an elongated decomposition chamber a finely atomized mixture of said salt and a vaporizable liquid, introducing a heating gas at its highest temperature into intimate contact with the said mixture at the same end of the chamber, whereby the atomized particles of the mixture are disintegrated by sudden vaporization of their liquid content and passing the resulting mixture co-currently through the elongated decomposition chamber, the heating gas being in quantity and at a temperature sufficient to vaporize the liquid from the mixture and decompose the salt and leave the decomposition chamber at a temperature near the decomposition temperature and carry practically all of the formed metal oxide with it in suspension.

3. Process as claimed in claim 1 wherein the decomposition products are separated from the heating agent and from each other outside the decomposition chamber.

4. Process as claimed in claim 1 wherein the substance decomposed is a metallic sulfate and the heating gas is introduced at a temperature of about 1300–1700° C.

5. Process as claimed in claim 1 wherein the substance decomposed is a magnesium salt and the heating gas is introduced at a temperature of about 1300–1700° C.

6. Process as claimed in claim 1 wherein the solid decomposition products are separated from the heating agent outside the decomposition chamber, fresh heating agent is heated by transfer of heat from the products leaving the decomposition chamber, the fresh heating agent is then further heated to the decomposition temperature and then introduced into the decomposition chamber.

7. Process as claimed in claim 1 wherein the substance decomposed is a metallic chloride and the heating gas is introduced at a temperature of about 1300–1700° C.

8. A process of thermally decomposing a metal salt to the production of the corresponding metal oxid in finely divided form which comprises atomizing a composition of the salt and a vaporizable liquid into an atmosphere of a heating gas including a combustible gas at a temperature sufficient to disintegrate the atomized particles of the composition by sudden vaporization of the liquid, passing the resulting mixture of disintegrated atomized composition and gas co-currently through an elongated chamber, and introducing air into said chamber at points distributed along the length of said chamber for combination with said combustible gas to maintain the temperature of the resulting mixture at substantially the decomposition temperature of the salt to the end of said elongated chamber, whereby the salt is decomposed and the resulting metal oxid is carried out of said elongated chamber in suspension in the gas which latter leaves the chamber at substantially the decomposition temperature of the salt.

KARL EBNER.